(12) United States Patent
Huang et al.

(10) Patent No.: US 12,393,843 B2
(45) Date of Patent: Aug. 19, 2025

(54) HUMAN-MACHINE MULTI-TURN CONVERSATION METHOD AND SYSTEM FOR HUMAN-MACHINE INTERACTION, AND INTELLIGENT APPARATUS

(71) Applicants: Gree Electric Appliances, Inc. of Zhuhai, Guangdong (CN); Leayun Technology Co., Ltd. of Zhuhai, Guangdong (CN)

(72) Inventors: Zirong Huang, Guangdong (CN); Jutao Jia, Guangdong (CN); Wei Wu, Guangdong (CN); Yuhui Li, Guangdong (CN); Lin Dai, Guangdong (CN)

(73) Assignees: Gree Electric Appliances, Inc. of Zhuhai, Guangdong (CN); Leayun Technology Co., Ltd. of Zhuhai, Zhuhai (CN)

( * ) Notice: Subject to any disclaimer, the term of this patent is extended or adjusted under 35 U.S.C. 154(b) by 859 days.

(21) Appl. No.: 17/623,665

(22) PCT Filed: Jun. 30, 2020

(86) PCT No.: PCT/CN2020/099423
§ 371 (c)(1),
(2) Date: Dec. 29, 2021

(87) PCT Pub. No.: WO2021/027421
PCT Pub. Date: Feb. 18, 2021

(65) Prior Publication Data
US 2022/0253710 A1    Aug. 11, 2022

(30) Foreign Application Priority Data
Aug. 12, 2019 (CN) .......................... 201910740449.4

(51) Int. Cl.
*G06N 3/082* (2023.01)
*G06F 16/3329* (2025.01)
(Continued)

(52) U.S. Cl.
CPC .......... *G06N 3/082* (2013.01); *G06F 16/3329* (2019.01); *G06F 16/3344* (2019.01); *G06N 5/02* (2013.01)

(58) Field of Classification Search
CPC ...... G06N 5/02; G06N 3/082; G06F 16/3329; G06F 16/3344
See application file for complete search history.

(56) References Cited

U.S. PATENT DOCUMENTS 9,754,037 B2 * 9/2017 Ayan ...................... G06Q 50/01
2018/0332167 A1 * 11/2018 Lu ........................ G06F 16/9535
(Continued)

FOREIGN PATENT DOCUMENTS

| AU | 2016201203 A1 * | 3/2016 | ....... G06F 16/24578 |
| CN | 105068661 A | 11/2015 | |

(Continued)

OTHER PUBLICATIONS

Dan Hong, etc., "Online User Activities Discovery based on Time Dependent Data", published via 2009 International Conference on Computational Science and Engineering, pp. 106-112, retrieved Feb. 20, 2025. (Year: 2009).*
(Continued)

*Primary Examiner* — Shourjo Dasgupta
(74) *Attorney, Agent, or Firm* — MCANDREWS HELD & MALLOY, LTD (57) ABSTRACT

The present disclosure relates to a human-machine multi-turn conversation method and system for human-machine interaction, and an intelligent apparatus. The method includes: S1, establishing a knowledge graph of user con-
(Continued)

versation behavior information; S2, determining, according to information currently input by a user, a node corresponding to the information currently input and at least one child node of the node in the knowledge graph; S3, calculating a support degree of the at least one child node relative to the node according to the number of times of querying the node and the number of times of querying both the at least one child node and the node in a historical query record of the knowledge graph; and S4, determining whether to output semantic information of the at least one child node by determining a size relation between the support degree and a preset support degree threshold value.

12 Claims, 6 Drawing Sheets

(51) Int. Cl.
  *G06F 16/334* (2025.01)
  *G06N 5/02* (2023.01)

(56) References Cited

U.S. PATENT DOCUMENTS

| | | | | |
|---|---|---|---|---|
| 2019/0087707 | A1* | 3/2019 | Cummins | G06F 16/3329 |
| 2019/0179917 | A1 | 6/2019 | Agrawal et al. | |
| 2020/0026758 | A1* | 1/2020 | Kitoh | G06F 40/30 |
| 2020/0117675 | A1* | 4/2020 | Tang | G06F 16/9535 |

FOREIGN PATENT DOCUMENTS

| | | | | |
|---|---|---|---|---|
| CN | 107688606 | A | 2/2018 | |
| CN | 108959366 | A | 12/2018 | |
| CN | 109087132 | A | 12/2018 | |
| CN | 110442700 | A | 11/2019 | |
| JP | 2009252070 | A * | 10/2009 | |
| JP | 2019114254 | A * | 7/2019 | G06F 16/24578 |
| KR | 101582929 | B1 * | 1/2016 | G06F 40/253 |
| KR | 20190057687 | A * | 5/2019 | |
| WO | WO-2007112840 | A1 * | 10/2007 | G06F 16/951 |

OTHER PUBLICATIONS

Biswarup Bhattacharya, etc., "Intent-Aware Contextual Recommendation System", published via Presented at the 5th International Workshop on Data Science and Big Data Analytics (DSBDA), 17th IEEE International Conference on Data Mining (ICDM), 2017, retrieved Feb. 20, 2025. (Year: 2017).*

Shu Wu, etc., "Session-based Recommendation with Graph Neural Networks", published Jan. 27, 2019 via Proceedings of the Thirty-Third AAAI Conference on Artificial Intelligence and Thirty-First Innovative Applications of Artificial Intelligence Conference, article No. 43, pp. 346-353, retrieved Feb. 20, 2025. (Year: 2019).*

Kunal Sengupta, etc., "Exploring Knowledge Graphs on Amazon Neptune Using Metaphactory", published Jan. 11, 2019 to https://aws.amazon.com/blogs/apn/exploring-knowledge-graphs-on-amazon-neptune-using-metaphactory, retrieved Jun. 14, 2025. (Year: 2019).*

Michael Galkin, "Building a Knowledge Graph-based Dialogue System at the 2nd ConvAI Summer School", published Jul. 16, 2019 to https://medium.com/deeppavlov/building-a-knowledge-graph-based-dialogue-system-at-the-2nd-convai-summer-school-ec2d0aa060e5, retrieved Jun. 2025. (Year: 2019).*

International Search Report, with a mailing date of Sep. 28, 2020, in International application No. PCT/CN2020/099423, filed on Jun. 30, 2020.

Priority first office action, dated Jul. 23, 2021, for application No. CN 201910740449.4, filed on Aug. 12, 2019.

* cited by examiner

HUMAN-MACHINE MULTI-TURN CONVERSATION METHOD AND SYSTEM FOR HUMAN-MACHINE INTERACTION, AND INTELLIGENT APPARATUS

CROSS-REFERENCE TO RELATED APPLICATION

The present disclosure is a 371 of International Patent Application No. PCT/CN2020/099423, filed Jun. 30, 2020, which takes a patent document No. 201910740449.4, filed on Aug. 12, 2019 and entitled "Human-Machine Multi-Turn Conversation Method and System for Human-Machine Interaction, and Intelligent Apparatus" as a priority document, the entire contents of which are incorporated herein by reference.

TECHNICAL FIELD

The present disclosure relates to the technical field of human-machine interaction, and particularly relates to a human-machine multi-turn conversation method and system for human-machine interaction, and an intelligent apparatus.

BACKGROUND

As developing rapidly, the smart home and the smart home appliances gradually come standard with speech interaction. However, although the current speech interaction achieves basic task-type interaction and meets instruction control, it is still unintelligent sometimes in a multi-dimensional conversation understanding and intelligent response process, causing a poor speech interaction experience.

For example, in the case of person-to-person conversation, the reason for its failure is the lack of a common cognitive context for both parties in most cases. Even in functional conversation, the form and content are likely to be inaccurate and can go back to the correct track only when corrected. The conversation is a collaborative and interactive behavior principally, participants of which create and acknowledge the meaning of a language in a rich but subtle context. Although current human-machine interaction can identify the user intention through the multiple turns of conversation and context association, the multiple turns of conversation will also cause the poor interaction experience. Thus, for speech interaction between a machine and a user, the machine needs to establish a cognitive background to know the meaning to be expressed by the user, so as to omit multiple turns of human-machine interactive conversation, thereby achieving intelligent interaction.

SUMMARY

For solving the above technical problem, the present disclosure provides a human-machine multi-turn conversation method for human-machine interaction. The method includes:
S1, establishing a knowledge graph of user conversation behavior information;
S2, determining, according to information currently input by a user, a node corresponding to the information currently input and at least one child node of the node in the knowledge graph;
S3, calculating a support degree of the at least one child node relative to the node according to the number of times of querying the node and the number of times of querying both the at least one child node and the node in a historical query record of the knowledge graph; and
S4, determining whether to output semantic information of the at least one child node by determining a size relation between the support degree and a preset support degree threshold value.

Preferably, in S3, the support degree is obtained by calculating a ratio of the number of times of querying both the at least one child node and the node to the number of times of querying the node.

In one embodiment, in S4,
whether the support degree is greater than the preset support degree threshold value is determined; In a case that the support degree is greater than the preset support degree threshold value, the semantic information of the at least one child node is output while semantic information of the node is output; and otherwise, only the semantic information of the node is output.

In another embodiment, in S4,
whether the support degree is greater than the preset support degree threshold value is determined; In a case that the support degree is greater than the preset support degree threshold value, a frequent item set containing all the at least one child nodes with the support degree greater than the preset support degree threshold value is formed, and the semantic information of each child node in the frequent item set is output in ascending order from large support degrees to small support degrees while the semantic information of the node is output; and otherwise, only the semantic information of the node is output.

Preferably, the method further includes:
S5, updating the knowledge graph in real time according to information input by the user in real time.

Preferably, S5 includes:
S51, collecting the information input by the user in real time to form structured data;
S52, performing entity recognition and naming on the structured data, and forming, in the knowledge graph, a new node corresponding to the information input by the user in real time;
S53, extracting relation data between the new node and an original node in the knowledge graph from a preset text corpus; and
S54, performing similarity calculation and matching on the new node and the original node, so as to form a node-relation-node structure and a node-attribute-attribute value structure in combination with the relation data.

One aspect of the present disclosure provides a human-machine multi-turn conversation system for human-machine interaction. the system includes:
a knowledge graph establishment module, configured to establish a knowledge graph of user conversation behavior information;
an index module, configured to determine, according to information currently input by a user, a node corresponding to the information currently input and at least one child node of the node in the knowledge graph;
a calculation module, configured to calculate a support degree of the at least one child node relative to the node according to the number of times of querying the node and the number of times of querying both the at least one child node and the node in a historical query record of the knowledge graph; and a determination module, configured to determine whether to output semantic information of the at least one child node by determining a size relation between the support degree and a preset support degree threshold value.

Preferably, the calculating a support degree of the at least one child node relative to the node according to the number of times of querying the node and the number of times of querying both the at least one child node and the node in a historical query record of the knowledge graph includes: obtaining the support degree by calculating a ratio of the number of times of querying both the at least one child node and the node to the number of times of querying the node.

Preferably, the system further includes:
a knowledge graph updating module configured to update the knowledge graph in real time according to information input by the user in real time.

Another aspect of the present disclosure further provides an intelligent apparatus. The intelligent apparatus includes:
a processor; and
a memory storing an executable code, where when executing the executable code, the processor performs the human-machine multi-turn conversation method for human-machine interaction.

Additional features and advantages of the present disclosure will be set forth in the following description, and in part will be obvious from the description, or can be learned by practice of the present disclosure. The objectives and other advantages of the present disclosure can be achieved and attained by a structure particularly pointed out in the description, claims, as well as the appended drawings.

BRIEF DESCRIPTION OF THE DRAWINGS

The accompanying drawings serve to provide a further understanding of the present disclosure, constitute a part of the description, serve to explain, together with the embodiments of the present disclosure, the present disclosure and do not constitute a limitation to the present disclosure.

DETAILED DESCRIPTION OF THE EMBODIMENTS

Implementation modes of the present disclosure will be described in detail below with reference to the accompanying drawings and examples, so that the implementation process of how the present disclosure applies technical means to solve technical problems and achieve technical effects can be fully understood and implemented. It is to be noted that the various embodiments in the present disclosure and various features in the various embodiments can be combined with one another as long as no conflict exists, and the formed technical solutions are within the scope of protection of the present disclosure.

In a conversation process between people, important information is not necessarily obtained by means of conversation, information contained in the conversation only accounts for a small part of the amount of transmitted information, and more information comes from a series of scene information, for example, the information of a speaker, a current time or place, etc. Since a machine lacks cognition on a user, more information needs to be obtained by means of multiple turns of conversation to supplement an intention of the user.

For solving the technical problem of a poor speech interaction experience caused by the fact that an intelligent apparatus in the prior art needs multiple turns of conversation to understand the intention of a user, the embodiments of the present disclosure provide a human-machine multi-turn conversation method and system for human-machine interaction, and an intelligent apparatus.

Embodiment 1

Figure 1:
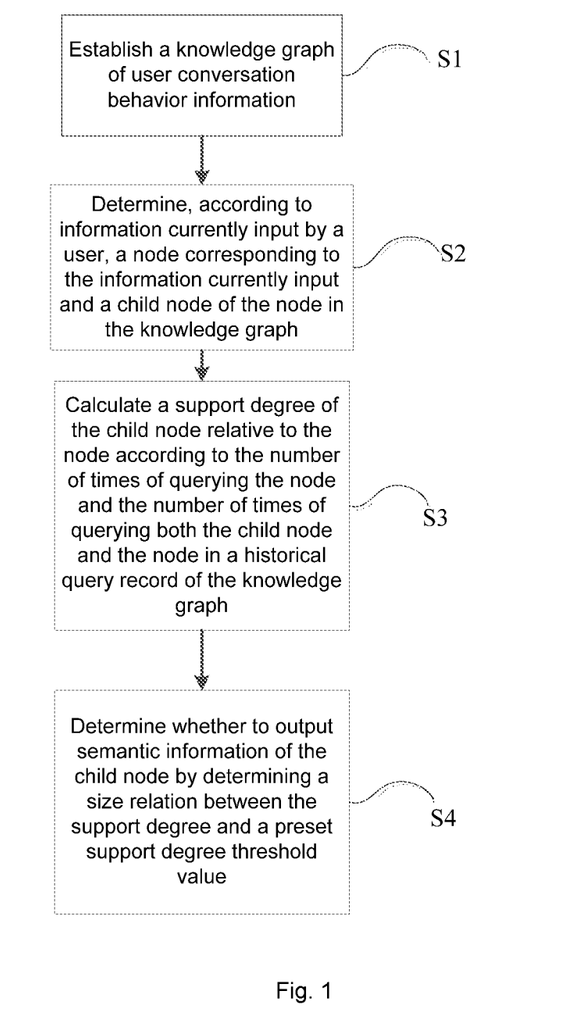
FIG. 1 is a flowchart of a human-machine multi-turn conversation method for human-machine interaction according to Embodiment 1 of the present disclosure.

FIG. 1 is a flowchart of a human-machine multi-turn conversation method for human-machine interaction according to Embodiment 1 of the present disclosure. As shown in FIG. 1, the method includes:
S1, establish a knowledge graph of user conversation behavior information;
S2, determine, according to information currently input by a user, a node corresponding to the information currently input and at least one child node of the node in the knowledge graph;
S3, calculate a support degree of the at least one child node relative to the node according to the number of times of querying the node and the number of times of querying both the at least one child node and the node in a historical query record of the knowledge graph; and
S4, determine whether to output semantic information of the at least one child node by determining a size relation between the support degree and a preset support degree threshold value.

In S1, a knowledge graph of user conversation behavior information is established. First, it should be noted that in some implementation modes, the knowledge graph is specific to a certain user, that is, a knowledge graph specific to that user is established for each user, and in other implementation modes, a knowledge graph is shared by a plurality of users, which is not limited in the present disclosure.

For ease of understanding and explanation, one user will be described below as an example.

Figure 2:
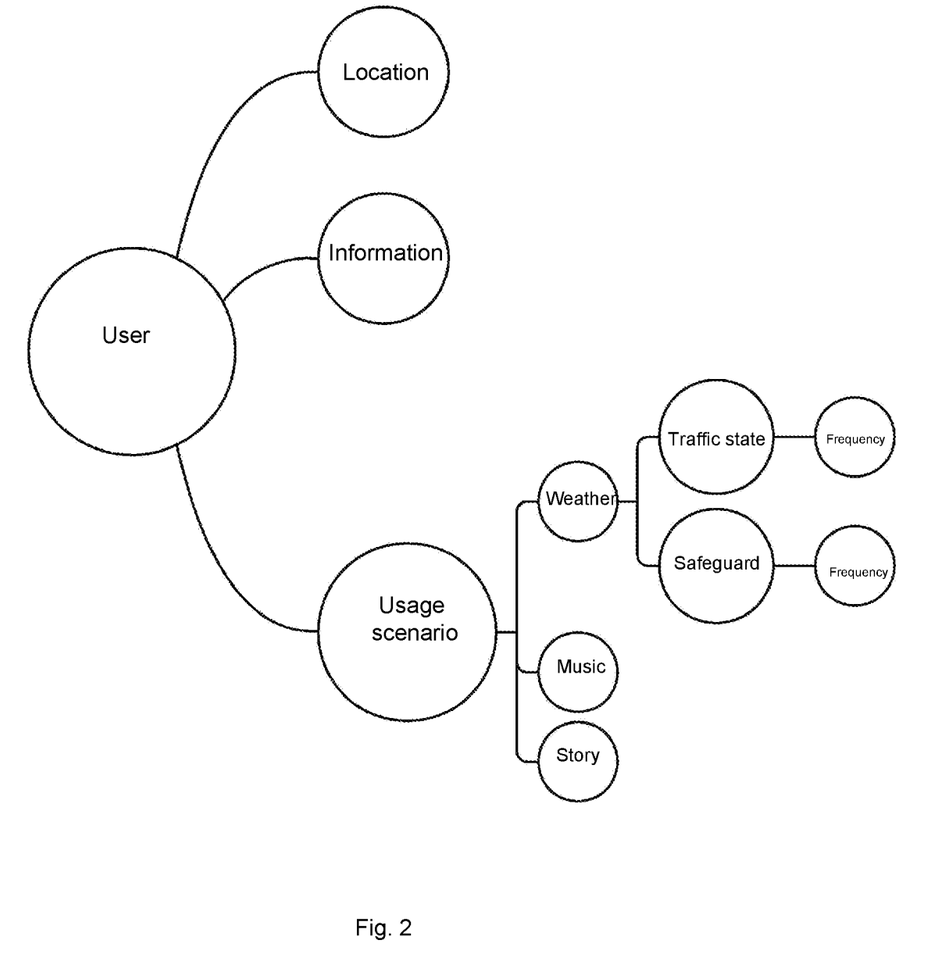
FIG. 2 schematically shows a knowledge graph of user conversation behavior information established according to S1 of an embodiment of the present disclosure.

FIG. 2 schematically shows a knowledge graph of user conversation behavior information established according to S1 of an embodiment of the present disclosure. As shown in FIG. 2, in S1, for a certain user, a knowledge graph of conversation behavior information of the user is established. The established knowledge graph includes nodes, child nodes, an attribute, an attribute value, a relation between the nodes, and a relation between the nodes, the attribute and the attribute value.

For example, the nodes include a location node, an information node, and a usage scenario node. For example, in some implementation modes, the information nodes include at least one or more of a time node, an interest node, a gender node, an age node, and a social feature node. For example, child nodes of the usage scenario node include a weather node, a music node, a story node, etc. In some implementation modes, child nodes of the weather node include a traffic state node, a safeguard node, etc. In this embodiment of the present disclosure, for each node and each child node in the knowledge graph, a frequency is taken as an attribute of each node and each child node, and correspondingly, a frequency value (a specific numerical value, for example, 5) is taken as an attribute value of each node and each child node. The frequency value refers to the number of times of querying the node or the at least one child node in the historical query record of the knowledge graph.

Figure 3:
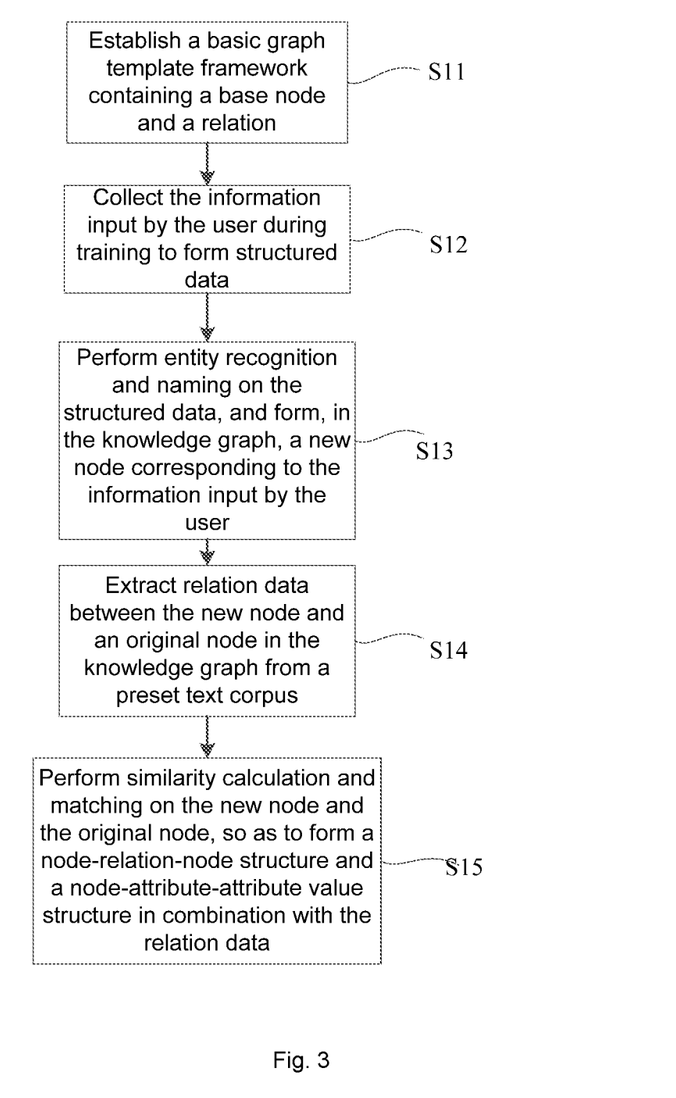
FIG. 3 is a flowchart of S1 of a human-machine multi-turn conversation method for human-machine interaction according to the embodiment of the present disclosure.

FIG. 3 is a flowchart of S1 of a human-machine multi-turn conversation method for human-machine interaction according to the embodiment of the present disclosure. In S1, in some implementation modes, the knowledge graph is established by means of a plurality of times of training by the user in an earlier stage on the basis of a basic graph template framework. As shown in FIG. 3, a specific process is as follows:

S11, establish a basic graph template framework containing a base node and a relation;
S12, collect the information input by the user during training to form structured data;
S13, perform entity recognition and naming on the structured data, and form, in the knowledge graph, a new node corresponding to the information input by the user;
S14, extract relation data between the new node and an original node in the knowledge graph from a preset text corpus; and
S15, perform similarity calculation and matching on the new node and the original node, so as to form a node-relation-node structure and a node-attribute-attribute value structure in combination with the relation data.

Specifically, in S11, a developer establishes the basic graph template framework containing the base node and the relation according to general needs of mass users. For example, most users are concerned with information of weather, traffic and news, and in some implementation modes, the weather, the traffic and the news can be formed as base nodes in the basic graph template framework. As another example, in some embodiments, a general user asks weather and then traffic, and in such a condition, a traffic state node can serve as at least one child node of a weather node. In this embodiment of the present disclosure, the frequency is taken as an attribute of the node and the at least one child node in the basic graph template framework, and correspondingly, the frequency value is taken as an attribute value of the node and the at least one child node in the basic graph template framework.

Since inquiry information of a user can vary from person to person, the basic graph template framework established in S11 can not specially meet a certain user, so the basic graph template framework needs to be trained so as to obtain a knowledge graph specific to the certain user.

Specifically, in S12, information input by the user during training is collected to form structured data in a top-down construction mode. The formed structured data is data logically expressed by a two-dimensional table structure, and has strict format and length specifications. For example, in some implementation modes, a user inputs semantic information of "Do I need to open the umbrella?" in such a condition, the structured data of "Open the umbrella" is formed in the top-down construction mode.

Next, S13 of entity recognition is executed. In S13, entity recognition and naming is performed on the structured data, and a new node corresponding to the information input by the user is formed in the knowledge graph. Specifically, based on the structured data obtained in S12, a server log is used to search for a semantic feature corresponding to the structured data so as to identify the structured data and name same. For example, as for the structured data of "Open the umbrella", it is identified as an action on the basis of a search result of the server log, and named as "Action, open the umbrella". Then, a new node of "Action, open the umbrella" is generated in the knowledge graph.

Next, S14 of relation extraction is executed. In S14, relation data between the new node and an original node in the knowledge graph is extracted from a preset text corpus. The original node refers to a node existing in the knowledge graph before the new node of "Action, open the umbrella" is formed. Preferably, in S14, relation extraction is performed through a semantic rule pattern matching method.

Next, S15 of knowledge fusion is executed. This step of knowledge fusion aims to eliminate ambiguity so as to facilitate fusion of the nodes. Specifically, similarity calculation is performed on the new node and the original node in ascending order, in which object alignment, entity matching and entity synonymous processing are included. In some implementation modes, by means of the above process, it can be determined whether the new node can be fused into the original node. For example, after similarity calculation and matching, it is determined that the new node of "Action, open the umbrella" is related to the original node of "Weather", then the new node of "Action, open the umbrella" is fused into the node of "weather", and 1 is added to an attribute value (frequency value) of an attribute frequency of the node of "weather" while the new node of "action, open the umbrella" is deleted. In addition, In a case that the new node is unrelated to the original node, the new node is reserved in the knowledge graph, and 1 is added to an attribute value (frequency value) of an attribute frequency of the new node. Then, a node-relation-node structure and a node-attribute-attribute value structure are formed in combination with the relation data obtained in S14. In some implementation modes, these two structures are referred to as an entity-relationship-entity structure and an entity-attribute-attribute value structure.

Therefore, on the basis of the basic graph template framework, by means of early training by the user, the knowledge graph specific to conversation behavior information of the user is obtained. In earlier interaction process, conversation of supplement to relevant intention is given to the user, for example, the user says "How is weather today?", and then the machine asks "Which city do you want to know the weather in?" to supplement the intention of the user, and updates the intention in the conversation information of the user to the node of the knowledge graph or the attribute value of the node, so as to establish the knowledge graph of the conversation behavior information of the user.

After the knowledge graph is established, S2 to S4 are executed next.

In S2, a node corresponding to information currently input by a user and at least one child node of the node in the knowledge graph are determined according to the information currently input. As shown in FIG. 2, taking the weather node as example, In a case that the user asks "How is weather today?", it is obtained, by means of semantic analysis, that the user wants to query "weather", then the weather node and the at least one child nodes of the weather node are determined in the knowledge graph, an attribute (for example, frequency) under the weather node is selected, the at least one child nodes, for example, a protective measure, a traffic state and a dressing match are traversed to form a set, and attribute values (frequency values) of the node and the at least one child nodes are read as items.

Then, S3 of calculating a support degree of the at least one child node relative to the node according to the number of times of querying the node and the number of times of querying both the at least one child node and the node in a historical query record of the knowledge graph is executed. Particularly, see Table 1.

TABLE 1

| Request sequence number | Weather A | Protective measure B | Traffic state C | Dressing match D |
|---|---|---|---|---|
| 1 | 1 | 0 | 1 | 0 |
| 2 | 1 | 1 | 1 | 0 |
| 3 | 1 | 1 | 0 | 1 |

As shown in Table 1, in the knowledge graph, each request of the user is recorded as a transaction, and each transaction records the involved node, where 1 represents a question and an answer involved in the transaction, and 0 represents a question and an answer not involved in the transaction. Taking the weather node A as an example, the at least one child nodes thereof include a protective measure B, a traffic state C and a dressing match D. For example, in the historical query record of the knowledge graph, the weather node A was queried three times in total, that is, a frequency value is 3, while the dressing match D was queried only once at the request sequence number of 3, that is, a frequency value of querying both the dressing match D and the weather node A is 1. Then a support degree of the dressing match D relative to the weather node A can be calculated according to the following mode: the support degree is obtained by calculating a ratio of the number of times of querying both the at least one child node and the node to the number of times of querying the node, that is, the support degree of the dressing match D relative to the weather node A (hereinafter referred to as the support degree of the dressing match D) is found as:

support degree P=transaction where both A and D occur/total transaction=⅓=33%, and the support degree of the dressing match D relative to the weather node A is: $P=P(A \& D)/P(A)=⅓=33\%$.

By means of the above calculation, the support degree of the dressing match D is 33%. It should be noted that the transaction where both A and D occur is a frequency value of querying both the dressing match D and the weather node A (when the weather node A is queried, the dressing match D is also queried, for example, the condition shown by the request sequence number 3 in Table 1), and the total transaction is a frequency value of querying the weather node A.

According to the same mode, a support degree of the protective measure B relative to the weather node A (hereinafter referred to as the support degree of the protective measure B) and a support degree of the traffic state C relative to the weather node A (hereinafter referred to as the support degree of the traffic state C) are sequentially calculated. According to the content shown in Table 1, the support degree of the protective measure B is 66% and the support degree of the traffic state C is 66% by calculation.

After the support degrees of all child nodes are calculated, S4 of determining, by determining a size relation between the support degree and a preset support degree threshold value, information to be output is executed. In S4, whether the support degree is greater than the preset support degree threshold value is determined; In a case that the support degree is greater than the preset support degree threshold value, the semantic information of the at least one child node is output while semantic information of the node is output; and otherwise, only the semantic information of the node is output.

Preferably, in this embodiment of the present disclosure, the preset support threshold value is set to be 50%. Certainly, the size of the preset support degree threshold value can be flexibly set according to actual situations, which is not limited in the present disclosure.

The support degree of the dressing match D is less than the preset support degree threshold value of 50% by means of determination, so semantic information of the dressing math D is not output; and the support degree of the protective measure B and the support degree of the traffic state C are both greater than the preset support degree threshold value of 50%, so semantic information of the at least one child node protective measure B and semantic information of the at least one child node traffic state C are output while semantic information of the weather node is output. For example, the machine can output information of "the weather in Guangzhou is sunny, ultraviolet rays are strong, please properly use sunscreen cream, and take the Hua'nan expressway for processing the congestion". In addition, In a case that the support degrees of all the at least one child nodes are not greater than the preset support degree threshold value of 50%, only the semantic information of the weather node is output, that is, the machine only outputs "the weather in Guangzhou is sunny".

As a preferred implementation mode, in addition to the above mode, S4 is executed in the following mode: whether the support degree is greater than the preset support degree threshold value is determined; In a case that the support degree is greater than the preset support degree threshold value, a frequent item set containing all the at least one child nodes with the support degree greater than the preset support degree threshold value is formed, and the semantic information of each child node in the frequent item set is output in ascending order from large support degrees to small support degrees while the semantic information of the node is output; and otherwise, only the semantic information of the node is output.

Specifically, after a size relation between the support degree and the preset support degree threshold value is determined, all the at least one child nodes with the support degree greater than the preset support degree threshold value form the frequent item set. For example, the frequent item set includes the protective measure B and the traffic state C, and then when the semantic information of the weather node is output, the semantic information of the protective measure B and the traffic state C in the frequent item set are output in ascending order from larger support degrees to small support degrees.

The problem that the interaction experience of the user is influenced due to the fact that a time for outputting speech information is too long is avoided. Preferably, in this embodiment of the present disclosure, when the semantic information of the node is output, only the semantic information of the first three child nodes with the highest support degrees in the frequent item set is output.

In summary, by applying the human-machine multi-turn conversation method for human-machine interaction in Embodiment 1 of the present disclosure, a machine can understand an intention of a user without needing multiple turns of speech conversation, so as to improve a speech interaction experience of the user.

Embodiment 2

Figure 4:
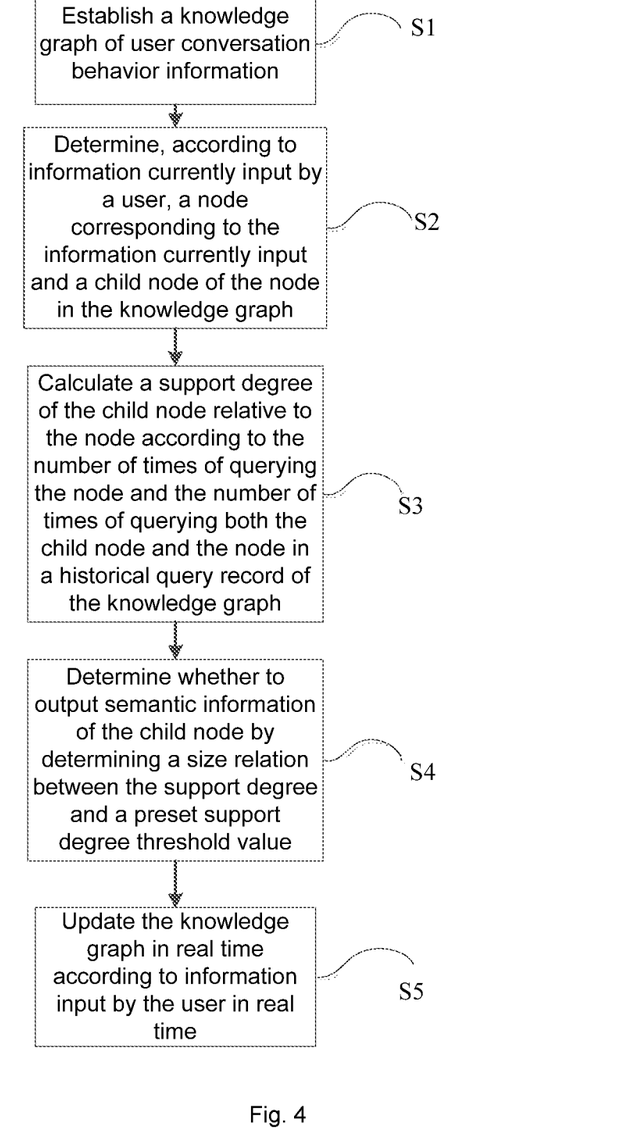
FIG. 4 is a flowchart of a human-machine multi-turn conversation method for human-machine interaction according to Embodiment 2 of the present disclosure.

FIG. 4 is a flowchart of a human-machine multi-turn conversation method for human-machine interaction according to Embodiment 2 of the present disclosure. Different from Embodiment 1, the human-machine multi-turn conversation method for human-machine interaction in Embodiment 2 can update a knowledge graph in real time. As shown in FIG. 4, the method includes:

S1, establish a knowledge graph of user conversation behavior information;

S2, determine, according to information currently input by a user, a node corresponding to the information currently input and at least one child node of the node in the knowledge graph;

S3, calculate a support degree of the at least one child node relative to the node according to the number of times of querying the node and the number of times of querying both the at least one child node and the node in a historical query record of the knowledge graph;

S4, determine whether to output semantic information of the at least one child node by determining a size relation between the support degree and a preset support degree threshold value; and S5, update the knowledge graph in real time according to information input by the user in real time.

In S1, a knowledge graph of user conversation behavior information is established. First, it should be noted that in some implementation modes, the knowledge graph is specific to a certain user, that is, a knowledge graph specific to that user is established for each user, and in other implementation modes, a knowledge graph is shared by a plurality of users, which is not limited in the present disclosure.

For ease of understanding and explanation, one user will be described below as an example.

FIG. 2 schematically shows a knowledge graph of user conversation behavior information established according to S1 of this embodiment of the present disclosure. As shown in FIG. 2, in S1, for a certain user, a knowledge graph of conversation behavior information of the user is established. The established knowledge graph includes nodes, child nodes, an attribute, an attribute value, a relation between the nodes, and a relation between the nodes, the attribute and the attribute value.

For example, the nodes include a location node, an information node, and a usage scenario node. For example, in some implementation modes, the information nodes include at least one or more of a time node, an interest node, a gender node, an age node, and a social feature node. For example, child nodes of the usage scenario node include a weather node, a music node, a story node, etc. In some implementation modes, child nodes of the weather node include a traffic state node, a safeguard node, etc. In this embodiment of the present disclosure, for each node and each child node in the knowledge graph, a frequency is taken as an attribute of each node and each child node, and correspondingly, a frequency value (a specific numerical value, for example, 5) is taken as an attribute value of each node and each child node. The frequency value refers to the number of times of querying the node or the at least one child node in the historical query record of the knowledge graph.

FIG. 3 is a flowchart of S1 of a human-machine multi-turn conversation method for human-machine interaction according to the embodiment of the present disclosure. In S1, in some implementation modes, the knowledge graph is established by means of a plurality of times of training by the user in an earlier stage on the basis of a basic graph template framework. As shown in FIG. 3, a specific process is as follows:

S11, establish a basic graph template framework containing a base node and a relation;

S12, collect the information input by the user during training to form structured data;

S13, perform entity recognition and naming on the structured data, and form, in the knowledge graph, a new node corresponding to the information input by the user;

S14, extract relation data between the new node and an original node in the knowledge graph from a preset text corpus; and S15, perform similarity calculation and matching on the new node and the original node, so as to form a node-relation-node structure and a node-attribute-attribute value structure in combination with the relation data.

Specifically, in S11, a developer establishes the basic graph template framework containing the base node and the relation according to general needs of mass users. For example, most users are concerned with information of weather, traffic and news, and in some implementation modes, the weather, the traffic and the news can be formed as base nodes in the basic graph template framework. As another example, a general user asks weather and then traffic, and in some embodiments, a traffic state node can serve as at least one child node of a weather node. In this embodiment of the present disclosure, the frequency is taken as an attribute of the node and the at least one child node in the basic graph template framework, and correspondingly, the frequency value is taken as an attribute value of the node and the at least one child node in the basic graph template framework.

Since inquiry information of a user can vary from person to person, the basic graph template framework established in S11 can not specially meet a certain user, so the basic graph template framework needs to be trained so as to obtain a knowledge graph specific to the certain user.

Specifically, in S12, information input by the user during training is collected to form structured data in a top-down construction mode. The formed structured data is data logically expressed by a two-dimensional table structure, and has strict format and length specifications. For example, in some implementation modes, a user inputs semantic information of "Do I need to open the umbrella?" in such a condition, the structured data of "Open the umbrella" is formed in the top-down construction mode.

Next, S13 of entity recognition is executed. In S13, entity recognition and naming is performed on the structured data, and a new node corresponding to the information input by the user is formed in the knowledge graph. Specifically, based on the structured data obtained in S12, a server log is used to search for a semantic feature corresponding to the structured data so as to identify the structured data and name same. For example, as for the structured data of "Open the umbrella", it is identified as an action on the basis of a search result of the server log, and named as "Action, open the umbrella". Then, a new node of "Action, open the umbrella" is generated in the knowledge graph.

Next, S14 of relation extraction is executed. In S14, relation data between the new node and an original node in the knowledge graph is extracted from a preset text corpus. The original node refers to a node existing in the knowledge graph before the new node of "Action, open the umbrella" is formed. Preferably, in S14, relation extraction is performed through a semantic rule pattern matching method.

Next, S15 of knowledge fusion is executed. This step of knowledge fusion aims to eliminate ambiguity so as to facilitate fusion of the nodes. Specifically, similarity calculation is performed on the new node and the original node in ascending order, in which object alignment, entity matching and entity synonymous processing are included. In some implementation modes, by means of the above process, it can be determined whether the new node can be fused into the original node. For example, after similarity calculation and matching, it is determined that the new node of "Action, open the umbrella" is related to the original node of "Weather", then the new node of "Action, open the umbrella" is fused into the node of "weather", and 1 is added to an attribute value (frequency value) of an attribute frequency of the node of "weather" while the new node of "action, open the umbrella" is deleted. In addition, In a case that the new node is unrelated to the original node, the new node is reserved in the knowledge graph, and 1 is added to an attribute value (frequency value) of an attribute frequency of the new node. Then, a node-relation-node structure and a node-attribute-attribute value structure are formed in combination with the relation data obtained in S14. In some implementation modes, these two structures are also referred to as an entity-relationship-entity structure and an entity-attribute-attribute value structure.

Therefore, on the basis of the basic graph template framework, by means of early training by the user, the knowledge graph specific to conversation behavior information of the user is obtained. In earlier interaction process, conversation of supplement to relevant intention is given to the user, for example, the user says "How is weather today?", and then the machine asks "Which city do you want to know the weather in?" to supplement the intention of the user, and updates the intention in the conversation information of the user to the node of the knowledge graph or the attribute value of the node, so as to establish the knowledge graph of the conversation behavior information of the user.

After the knowledge graph is established, S2 to S4 are executed next.

In S2, a node corresponding to information currently input by a user and at least one child node of the node in the knowledge graph are determined according to the information currently input. As shown in FIG. 2, taking the weather node as example, In a case that the user asks "How is weather today?", it is obtained, by means of semantic analysis, that the user wants to query "weather", then the weather node and the at least one child nodes of the weather node are determined in the knowledge graph, an attribute (for example, frequency) under the weather node is selected, the at least one child nodes, for example, a protective measure, a traffic state and a dressing match are traversed to form a set, and attribute values (frequency values) of the node and the at least one child nodes are read as items.

Then, S3 of calculating a support degree of the at least one child node relative to the node according to the number of times of querying the node and the number of times of querying both the at least one child node and the node in a historical query record of the knowledge graph is executed. Particularly, see Table 1.

TABLE 1

| Request sequence number | Weather A | Protective measure B | Traffic state C | Dressing match D |
|---|---|---|---|---|
| 1 | 1 | 0 | 1 | 0 |
| 2 | 1 | 1 | 1 | 0 |
| 3 | 1 | 1 | 0 | 1 |

As shown in Table 1, in the knowledge graph, each request of the user is recorded as a transaction, and each transaction records the involved node, where 1 represents a question and an answer involved in the transaction, and 0 represents a question and an answer not involved in the transaction. Taking the weather node A as an example, the at least one child nodes thereof include a protective measure B, a traffic state C and a dressing match D. For example, in the historical query record of the knowledge graph, the weather node A was queried three times in total, that is, a frequency value is 3, while the dressing match D was queried only once at the request sequence number of 3, that is, a frequency value of querying both the dressing match D and the weather node A is 1. Then a support degree of the dressing match D relative to the weather node A can be calculated according to the following mode: the support degree is obtained by calculating a ratio of the number of times of querying both the at least one child node and the node to the number of times of querying the node, that is, the support degree of the dressing match D relative to the weather node A (hereinafter referred to as the support degree of the dressing match D) is found as:

support degree P=transaction where both A and D occur/total transaction=⅓=33%, and the support degree of the dressing match D relative to the weather node A is: P=P (A & D)/P (A)=⅓=33%.

By means of the above calculation, the support degree of the dressing match D is 33%. It should be noted that the transaction where both A and D occur is a frequency value of querying both the dressing match D and the weather node A (when the weather node A is queried, the dressing match D is also queried, for example, the condition shown by the request sequence number 3 in Table 1), and the total transaction is a frequency value of querying the weather node A.

According to the same mode, a support degree of the protective measure B relative to the weather node A (hereinafter referred to as the support degree of the protective measure B) and a support degree of the traffic state C relative to the weather node A (hereinafter referred to as the support degree of the traffic state C) are sequentially calculated. According to the content shown in Table 1, the support degree of the protective measure B is 66% and the support degree of the traffic state C is 66% by calculation.

After the support degrees of all child nodes are calculated, S4 of determining, by determining a size relation between the support degree and a preset support degree threshold value, information to be output is executed. In S4, whether the support degree is greater than the preset support degree threshold value is determined; In a case that the support degree is greater than the preset support degree threshold value, the semantic information of the at least one child node is output while semantic information of the node is output; and otherwise, only the semantic information of the node is output.

Preferably, in this embodiment of the present disclosure, the preset support threshold value is set to be 50%. Certainly, the size of the preset support degree threshold value can be flexibly set according to actual situations, which is not limited in the present disclosure.

The support degree of the dressing match D is less than the preset support degree threshold value of 50% by means of determination, so semantic information of the dressing math D is not output; and the support degree of the protective measure B and the support degree of the traffic state C are both greater than the preset support degree threshold value of 50%, so semantic information of the at least one child node protective measure B and semantic information of the at least one child node traffic state C are output while semantic information of the weather node is output. For example, the machine can output information of "the weather in Guangzhou is sunny, ultraviolet rays are strong, please properly use sunscreen cream, and take the Hua'nan expressway for processing the congestion". In addition, In a case that the support degrees of all the at least one child nodes are not greater than the preset support degree threshold value of 50%, only the semantic information of the weather node is output, that is, the machine only outputs "the weather in Guangzhou is sunny".

As a preferred implementation mode, in addition to the above mode, S4 can be further executed in the following mode: whether the support degree is greater than the preset support degree threshold value is determined; In a case that the support degree is greater than the preset support degree threshold value, a frequent item set containing all the at least one child nodes with the support degree greater than the preset support degree threshold value is formed, and the semantic information of each child node in the frequent item set is output in ascending order from large support degrees to small support degrees while the semantic information of the node is output; and otherwise, only the semantic information of the node is output.

Specifically, after a size relation between the support degree and the preset support degree threshold value is determined, all the at least one child nodes with the support degree greater than the preset support degree threshold value form the frequent item set. For example, the frequent item set includes the protective measure B and the traffic state C, and then when the semantic information of the weather node is output, the semantic information of the protective measure B and the traffic state C in the frequent item set are output in ascending order from larger support degrees to small support degrees.

The problem that the interaction experience of the user is influenced due to the fact that a time for outputting speech information is too long is avoided. Preferably, in this embodiment of the present disclosure, when the semantic information of the node is output, only the semantic information of the first three child nodes with the highest support degrees in the frequent item set is output.

In addition, for updating the established knowledge graph in real time, on the basis of the human-machine multi-turn conversation method for human-machine interaction in Embodiment 1, Embodiment 2 adds S5: update the knowledge graph in real time according to the information input by the user in real time. After the knowledge graph is established or the early training by the user is completed, for updating the knowledge graph in real time along with an interest or an inquiry intention of the user to improve the interaction experience of the user, Embodiment 2 of the present disclosure updates the knowledge graph in real time according to the information input by the user in real time.

Figure 5:
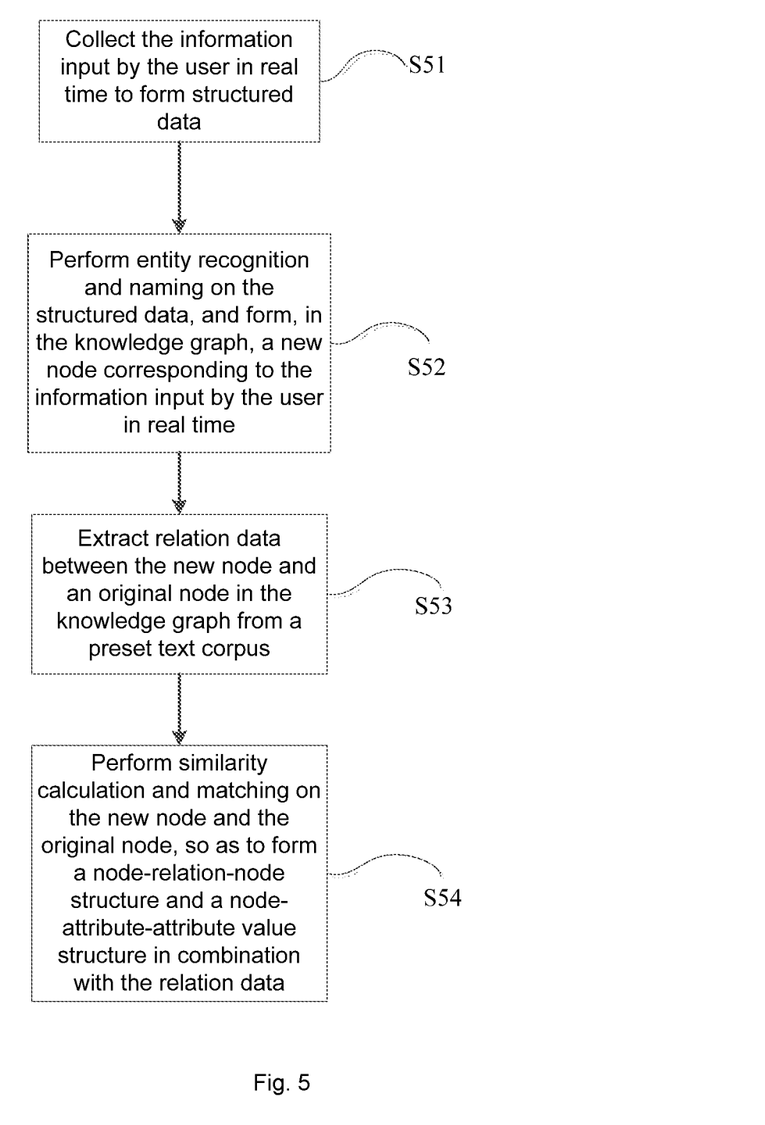
FIG. 5 is a flowchart of S5 of the human-machine multi-turn conversation method for human-machine interaction according to Embodiment 2 of the present disclosure.

FIG. 5 is a flowchart of S5 of the human-machine multi-turn conversation method for human-machine interaction according to Embodiment 2 of the present disclosure. As shown in FIG. 5, S5 includes:

S51, collect the information input by the user in real time to form structured data;

S52, perform entity recognition and naming on the structured data, and form, in the knowledge graph, a new node corresponding to the information input by the user in real time;

S53, extract relation data between the new node and an original node in the knowledge graph from a preset text corpus; and S54, perform similarity calculation and matching on the new node and the original node, so as to form a node-relation-node structure and a node-attribute-attribute value structure in combination with the relation data.

Specifically, in S51, information input by the user in real time is collected to form structured data in a top-down construction mode. The formed structured data is data logically expressed by a two-dimensional table structure, and has strict format and length specifications. For example, in some implementation modes, a user inputs semantic information of "Do I need to take the umbrella?" in such a condition, the structured data of "Take the umbrella" is formed in the top-down construction mode.

Next, S52 of entity recognition is executed. In S52, entity recognition and naming is performed on the structured data, and a new node corresponding to the information input by the user is formed in the knowledge graph. Specifically, based on the structured data obtained in S51, a server log is used to search for a semantic feature corresponding to the structured data so as to identify the structured data and name same. For example, as for the structured data of "Take the umbrella", it is identified as an action on the basis of a search result of the server log, and named as "Action, take the umbrella". Then, a new node of "Action, take the umbrella" is generated in the knowledge graph.

Next, S53 of relation extraction is executed. In S53, relation data between the new node and an original node in the knowledge graph is extracted from a preset text corpus. The original node refers to a node existing in the knowledge graph before the new node of "Action, take the umbrella" is formed. Preferably, in S53, relation extraction is performed through a semantic rule pattern matching method.

Next, S54 of knowledge fusion is executed. This step of knowledge fusion aims to eliminate ambiguity so as to facilitate fusion of the nodes. Specifically, similarity calculation is performed on the new node and the original node in ascending order, in which object alignment, entity matching and entity synonymous processing are included. In other implementation modes, by means of the above process, it can be determined whether the new node can be fused into the original node. For example, after similarity calculation and matching, it is determined that the new node of "Action, take the umbrella" is related to the original node of "Weather", then the new node of "Action, take the umbrella" is fused into the node of "weather", and 1 is added to an attribute value (frequency value) of an attribute frequency of the node of "weather" while the new node of "action, take the umbrella" is deleted. In addition, In a case that the new node is unrelated to the original node, the new node is reserved in the knowledge graph, and 1 is added to an attribute value (frequency value) of an attribute frequency of the new node. Then, a node-relation-node structure and a node-attribute-attribute value structure are formed in combination with the relation data obtained in S53. In other implementation modes, these two structures are also referred to as an entity-relationship-entity structure and an entity-attribute-attribute value structure.

In summary, by applying the human-machine multi-turn conversation method for human-machine interaction in Embodiment 2 of the present disclosure, a machine can understand an intention of a user without needing multiple turns of speech conversation, so as to improve a speech interaction experience of the user.

In addition, applying the human-machine multi-turn conversation method for human-machine interaction in Embodiment 2 of the present disclosure can update a knowledge graph in real time along with an interest or an inquiry intention of the user, so as to improve the interaction experience of the user.

Embodiment 3

Figure 6:
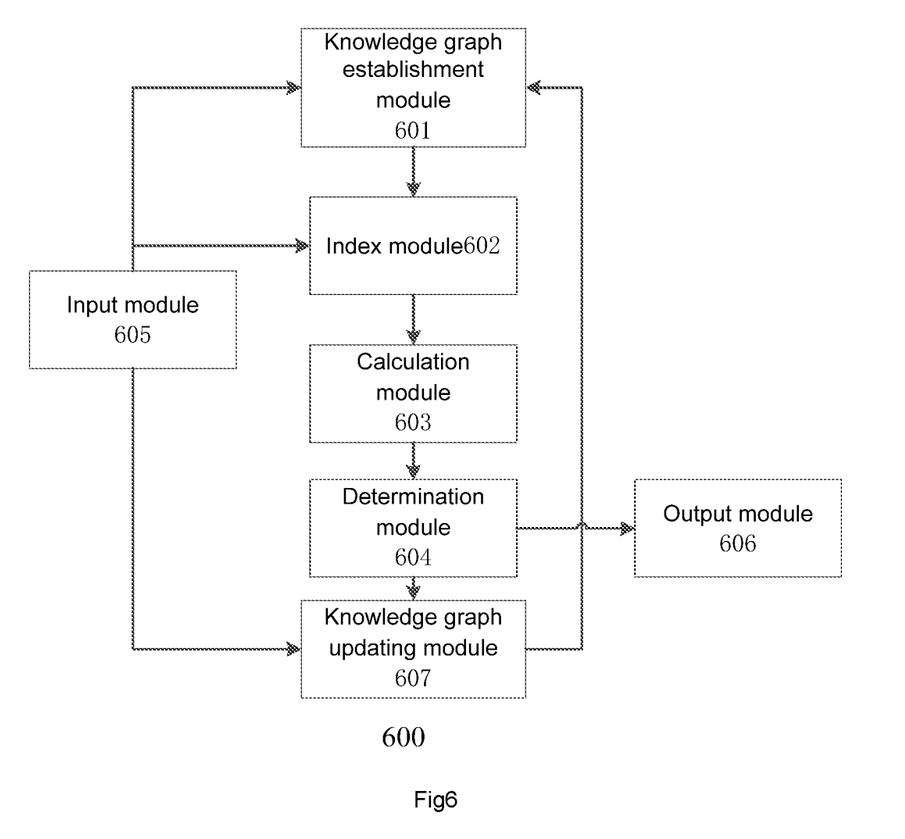
FIG. 6 schematically shows a human-machine multi-turn conversation system for human-machine interaction according to Embodiment 3 of the present disclosure.

Corresponding to the human-machine multi-turn conversation method for man-machine interaction in Embodiment 1 and Embodiment 2 of the present disclosure, Embodiment 3 of the present disclosure provides a human-machine multi-turn conversation system for man-machine interaction. FIG. 6 schematically shows a human-machine multi-turn conversation system for human-machine interaction according to Embodiment 3 of the present disclosure. As shown in FIG. 6, the system 600 includes:

a knowledge graph establishment module 601 configured to establish a knowledge graph of user conversation behavior information;

an index module 602 configured to determine, according to information currently input by a user, a node corresponding to the information currently input and at least one child node of the node in the knowledge graph;

a calculation module 603 configured to calculate a support degree of the at least one child node relative to the node according to the number of times of querying the node and the number of times of querying both the at least one child node and the node in a historical query record of the knowledge graph; and a determination module 604 configured to determine whether to output semantic information of the at least one child node by determining a size relation between the support degree and a preset support degree threshold value.

In addition, the system 600 further includes:

an input module 605 configured to receive information input by the user; and an output module 606 connected to the determination module 604 and configured to output, according to a determination result of the determination module 604, information to be output.

For ease of understanding and explanation, one user will be described below as an example.

As shown in FIGS. 2 and 6, for a certain user, the knowledge graph establishment module 601 establishes a knowledge graph of conversation behavior information of the user. The established knowledge graph includes nodes, child nodes, an attribute, an attribute value, a relation between the node and the (child) node, and a relation between the nodes, the attribute and the attribute value.

For example, the nodes include a location node, an information node, and a usage scenario node. For example, in some implementation modes, the information nodes include at least one or more of a time node, an interest node, a gender node, an age node, and a social feature node. For example, child nodes of the usage scenario node include a weather node, a music node, a story node, etc. In some implementation modes, child nodes of the weather node include a traffic state node, a safeguard node, etc. In this embodiment of the present disclosure, for each node and each child node in the knowledge graph, a frequency is taken as an attribute of each node and each child node, and correspondingly, a frequency value (a specific numerical value, for example, 5) is taken as an attribute value of each node and each child node. The frequency value refers to the number of times of querying the node or the at least one child node in the historical query record of the knowledge graph.

In this embodiment of the present disclosure, the knowledge graph establishment module 601 establishes the knowledge graph by means of a plurality of times of training by the user in an earlier stage on the basis of a basic graph template framework knowledge graph. A specific process is as follows:

First, the knowledge graph establishment module 601 establishes the basic graph template framework containing the base node and the relation according to general needs of mass users. For example, in some implementation modes, most users are concerned with information of weather, traffic and news, and in such a condition, the weather, the traffic and the news can be formed as base nodes in the basic graph template framework. As another example, in some implementation modes, a general user asks weather and then traffic, and in such a condition, a traffic state node serves as at least one child node of a weather node. In this embodiment of the present disclosure, the frequency is taken as an attribute of the node and the at least one child node in the basic graph template framework, and correspondingly, the frequency value is taken as an attribute value of the node and the at least one child node in the basic graph template framework.

Since inquiry information of a user can vary from person to person, the basic graph template framework established can not specially meet a certain user, so the basic graph template framework needs to be trained so as to obtain a knowledge graph specific to the certain user.

Then, the knowledge graph establishment module 601 generates structured data in a top-down construction mode according to information, input by the user during training, collected by the input module 605. The formed structured data is data logically expressed by a two-dimensional table structure, and has strict format and length specifications. For example, in some implementation modes, a user inputs semantic information of "Do I need to open the umbrella?" in such a condition, the structured data of "Open the umbrella" is formed in the top-down construction mode.

Then, the knowledge graph establishment module 601 performs entity recognition and naming on the structured data, and generates a new node corresponding to the information input by the user in the knowledge graph. Specifically, based on the obtained structured data, a server log is used to search for a semantic feature corresponding to the structured data so as to identify the structured data and name same. For example, as for the structured data of "Open the umbrella", it is identified as an action on the basis of a search result of the server log, and named as "Action, open the umbrella". Then, a new node of "Action, open the umbrella" is generated in the knowledge graph.

Then, the knowledge graph establishment module 601 extracts relation data between the new node and an original node in the knowledge graph from a preset text corpus. The original node refers to a node existing in the knowledge graph before the new node of "Action, open the umbrella" is formed. Preferably, the knowledge graph establishment module 601 performs relation extraction by running an algorithm of semantic rule pattern matching stored in itself.

Finally, the knowledge graph establishment module 601 performs knowledge fusion on the new node and the original node. Knowledge fusion aims to eliminate ambiguity so as to facilitate fusion of the nodes. Specifically, similarity calculation is performed on the new node and the original node in ascending order, in which object alignment, entity matching and entity synonymous processing are included. Through the above processing, in some implementation modes, it can be determined that whether a new node can be fused into the original node. For example, after similarity calculation and matching, it is determined that the new node of "Action, open the umbrella" is related to the original node of "Weather", then the new node of "Action, open the umbrella" is fused into the node of "weather", and 1 is added to an attribute value (frequency value) of an attribute frequency of the node of "weather" while the new node of "action, open the umbrella" is deleted. In addition, In a case that the new node is unrelated to the original node, the new node is reserved in the knowledge graph, and 1 is added to an attribute value (frequency value) of an attribute frequency of the new node. Then, a node-relation-node structure and a node-attribute-attribute value structure are formed in combination with the obtained relation data. In some implementation modes, these two structures are also referred to as an entity-relationship-entity structure and an entity-attribute-attribute value structure.

Thus, the knowledge graph establishment module 601 gives the user a supplement to the relevant intentions by means of early training by the user, that is, during early interaction, on the basis of the basic graph template framework. In multiple turns of conversation, In a case that the user asks "How is weather today?", and then the machine asks "Which city do you want to know the weather in?" to supplement the intention of the user, and updates the intention in the conversation information of the user to the node of the knowledge graph or the attribute value of the node, so as to establish the knowledge graph of the conversation behavior information of the user.

After the knowledge graph is established, the index module 602 determines a node corresponding to information currently input by a user and at least one child node of the node in the knowledge graph according to the information currently input.

As shown in FIG. 2, taking the weather node as example, In a case that the user asks "How is weather today?", the index module 602 obtains, by means of semantic analysis, that the user wants to query "weather", then the index module 602 determines the weather node and the at least one child nodes of the weather node in the knowledge graph, selects an attribute (for example, frequency) under the weather node, traverses the at least one child nodes, for example, a protective measure, a traffic state and a dressing match to form a set, and reads attribute values (frequency values) of the node and the at least one child nodes as items.

After the node, the at least one child node, the attribute value of the node and the attribute value of the at least one child node are obtained, the calculation module 603 calculates a support degree of the at least one child node relative to the node according to the number of times of querying the node and the number of times of querying both the at least one child node and the node in a historical query record of the knowledge graph. Particularly, see Table 1:

TABLE 1

| Request sequence number | Weather A | Protective measure B | Traffic state C | Dressing match D |
|---|---|---|---|---|
| 1 | 1 | 0 | 1 | 0 |
| 2 | 1 | 1 | 1 | 0 |
| 3 | 1 | 1 | 0 | 1 |

As shown in Table 1, in the knowledge graph, each request of the user is recorded as a transaction, and each transaction records the involved node, where 1 represents a question and an answer involved in the transaction, and 0 represents a question and an answer not involved in the transaction. Taking the weather node A as an example, the at least one child nodes thereof include a protective measure B, a traffic state C and a dressing match D. For example, in the historical query record of the knowledge graph, the weather node A was queried three times in total, that is, a frequency value is 3, while the dressing match D was queried only once at the request sequence number of 3, that is, a frequency value of querying both the dressing match D and the weather node A is 1. Then the calculation module 603 calculates a support degree of the dressing match D relative to the weather node A, specifically, the calculation module 603 obtains the support degree by calculating a ratio of the number of times of querying both the at least one child node and the node to the number of times of querying the node, that is, the support degree of the dressing match D relative to the weather node A (hereinafter referred to as the support degree of the dressing match D) is found as:

support degree P=transaction where both A and D occur/total transaction=⅓=33%, and the support degree of the dressing match D relative to the weather node A is: $P = P(A \& D)/P(A) = 1/3 = 33\%$.

By means of the above calculation, the calculation module 603 calculates that the support degree of the dressing match D is 33%. It should be noted that the transaction where both A and D occur is a frequency value of querying both the dressing match D and the weather node A (when the weather node A is queried, the dressing match D is also queried, for example, the condition shown by the request sequence number 3 in Table 1), and the total transaction is a frequency value of querying the weather node A.

According to the same mode, the calculation module 603 sequentially calculates a support degree of the protective measure B relative to the weather node A (hereinafter referred to as the support degree of the protective measure B) and a support degree of the traffic state C relative to the weather node A (hereinafter referred to as the support degree of the traffic state C). According to the content shown in Table 1, the calculation module 603 calculates that the support degree of the protective measure B is 66% and the support degree of the traffic state C is 66%.

After the support degrees of all child nodes are calculated, the determination module 604 determines, by determining a size relation between the support degree and a preset support degree threshold value, information to be output. The determination module 604 determines that whether the support degree is greater than the preset support degree threshold value is determined; In a case that the support degree is greater than the preset support degree threshold value, the semantic information of the at least one child node is output while semantic information of the node is output; and otherwise, only the semantic information of the node is output.

Preferably, in this embodiment of the present disclosure, the preset support threshold value is set to be 50%. Certainly, the size of the preset support degree threshold value can be flexibly set according to actual situations, which is not limited in the present disclosure.

The support degree of the dressing match D is less than the preset support degree threshold value of 50% by means of determination of the determination module 604, so semantic information of the dressing math D is not output; and the support degree of the protective measure B and the support degree of the traffic state C are both greater than the preset support degree threshold value of 50%, so the output module 606 outputs semantic information of the at least one child node protective measure B and semantic information of the at least one child node traffic state C while outputting semantic information of the weather node. For example, the output module 606 can output information of "the weather in Guangzhou is sunny, ultraviolet rays are strong, please properly use sunscreen cream, and take the Hua'nan expressway for processing the congestion". In addition, In a case that the support degrees of all the at least one child nodes are not greater than the preset support degree threshold value of 50%, the output module 606 only outputs the semantic information of the weather node, for example, the output module 606 only outputs the information of "the weather in Guangzhou is sunny".

As a preferred implementation mode, in addition to the above mode, the determination module 604 also determines in the following mode: whether the support degree of each child node is greater than the preset support degree threshold value is determined; In a case that the support degree is greater than the preset support degree threshold value, a frequent item set containing all the at least one child nodes with the support degree greater than the preset support degree threshold value is formed, and the semantic information of each child node in the frequent item set is output in ascending order from large support degrees to small support degrees while the semantic information of the node is output; and otherwise, only the semantic information of the node is output.

Specifically, after a size relation between the support degree and the preset support degree threshold value is determined, the determination module 604 makes all the at least one child nodes with the support degree greater than the preset support degree threshold value form the frequent item set. For example, the frequent item set includes the protective measure B and the traffic state C. Then the output module 606 output, according to the determination result of the determination module 604, the semantic information of the protective measure B and the traffic state C in the frequent item set in ascending order from larger support degrees to small support degrees while outputting the semantic information of the weather node.

The problem that the interaction experience of the user is influenced due to the fact that a time for outputting speech information is too long is avoided. Preferably, in this embodiment of the present disclosure, the output module 606 only outputs the semantic information of the first three child nodes with the highest support degrees in the frequent item set while outputting the semantic information of the node.

After the knowledge graph is established or the early training by the user is completed, for updating the knowledge graph in real time along with an interest or an inquiry intention of the user to improve the interaction experience of the user, the system of Embodiment 3 of the present disclosure further includes: a knowledge graph updating module 607 configured to updates the knowledge graph in real time according to the information input by the user in real time.

Specifically, the knowledge graph updating module 607 generates structured data in a top-down construction mode according to information, input by the user in real time, collected by the input module 605. The formed structured data is data logically expressed by a two-dimensional table structure, and has strict format and length specifications. For example, in some implementation modes, a user inputs semantic information of "Do I need to take the umbrella?" in such a condition, the structured data of "Take the umbrella" is formed in the top-down construction mode.

Then, the knowledge graph updating module 607 performs entity recognition and naming on the structured data, and generates a new node corresponding to the information input by the user in the knowledge graph. Specifically, based on the obtained structured data, a server log is used to search for a semantic feature corresponding to the structured data so as to identify the structured data and name same. For example, as for the structured data of "Take the umbrella", it is identified as an action on the basis of a search result of the server log, and named as "Action, take the umbrella". Then, a new node of "Action, take the umbrella" is generated in the knowledge graph node.

Then, the knowledge graph updating module 607 extracts relation data between the new node and an original node in the knowledge graph from a preset text corpus. The original node refers to a node existing in the knowledge graph before the new node of "Action, take the umbrella" is formed. Preferably, the knowledge graph updating module 607 performs relation extraction by running an algorithm of semantic rule pattern matching stored in itself.

Then, the knowledge graph updating module 607 performs similarity calculation on the new node and the original node in ascending order, in which object alignment, entity matching and entity synonymous processing are included. In some implementation modes, by means of the above process, it can be determined whether the new node can be fused into the original node. For example, after similarity calculation and matching, it is determined that the new node of "Action, take the umbrella" is related to the original node of "Weather", then the new node of "Action, take the umbrella" is fused into the node of "weather", and 1 is added to an attribute value (frequency value) of an attribute frequency of the node of "weather" while the new node of "action, take the umbrella" is deleted. In addition, In a case that the new node is unrelated to the original node, the new node is reserved in the knowledge graph, and 1 is added to an attribute value (frequency value) of an attribute frequency of the new node. Then, a node-relation-node structure and a node-attribute-attribute value structure are formed in combination with the obtained relation data. In some implementation modes, these two structures are also referred to as an entity-relationship-entity structure and an entity-attribute-attribute value structure.

Thus, the knowledge graph updating module 607 updates the knowledge graph in real time.

It is noted that in some implementation modes, updating of the knowledge graph is also completed by the knowledge graph establishment module 601, and the system 600 does not include the knowledge graph updating module 607 when the knowledge graph establishment module 601 updates the knowledge graph in real-time, which is not limited in the present disclosure.

Accordingly, an embodiment of the present disclosure further provides an intelligent apparatus. The intelligent apparatus includes:
- a processor; and
- a memory storing an executable code, where when executing the executable code, the processor performs the human-machine multi-turn conversation method for human-machine interaction in Embodiment 1 or Embodiment 2.

In summary, by applying the human-machine multi-turn conversation method and system for human-machine interaction, and the intelligent apparatus, a machine can understand an intention of a user without needing multiple turns of speech conversation, so as to improve a speech interaction experience of the user.

In addition, applying the human-machine multi-turn conversation method and system for human-machine interaction, and the intelligent apparatus in the embodiments of the present disclosure can update a knowledge graph in real time along with an interest or an inquiry intention of the user, so as to improve the interaction experience of the user.

Obviously, those skilled in the art will appreciate that the modules or steps of the present disclosure described above can be implemented with a general-purpose computing device, and can be centralized on a single computing device or distributed on a network composed of a plurality of computing devices, selectively, they can be implemented with program codes executable by the computing device, such that the they can be stored in a storage device to be executed by the computing device, or they can be fabricated separately as individual integrated circuit modules, or several of them or steps can be fabricated as a single integrated circuit module. Thus, the present disclosure is not limited to any particular combination of hardware and software.

While the present disclosure has disclosed embodiments as described above, what has been described is only to facilitate understanding of the present disclosure and is not intended to be limiting of the present disclosure. Those skilled in the art to which the present disclosure pertains can make any modifications and changes in form and detail of implementation without departing from the spirit and scope of the present disclosure, but the scope of protection of the present disclosure is intended to be subject to the scope defined by the appended claims.

What is claimed is:

1. A human-machine multi-turn conversation method for human-machine interaction, comprising:
    S1, establishing a knowledge graph of user conversation behavior information, wherein the knowledge graph of user conversation behavior information is obtained by training on a basic graph template framework, and the basic graph template framework contains basic nodes and relationships;
    S2, determining, according to information currently input by a user, a node corresponding to the information currently input and at least one child node of the node in the knowledge graph;
    S3, calculating a support degree of the at least one child node relative to the node according to a number of times of querying the node and the number of times of querying both the at least one child node and the node in a historical query record of the knowledge graph; and
    S4, determining whether to output semantic information of the at least one child node by determining a size relation between the support degree and a preset support degree threshold value,
    wherein in S3, the support degree is obtained by calculating a ratio of the number of times of querying both the at least one child node and the node to the number of times of querying the node.

2. The human-machine multi-turn conversation method according to claim 1, wherein in S4,
    whether the support degree is greater than the preset support degree threshold value is determined;
    in a case that the support degree is greater than the preset support degree threshold value, the semantic information of the at least one child node is output and semantic information of the node is output; and
    otherwise, only the semantic information of the node is output.

3. The human-machine multi-turn conversation method according to claim 1, wherein in S4,
    whether the support degree is greater than the preset support degree threshold value is determined;
    in a case that the support degree is greater than the preset support degree threshold value, a frequent item set containing all the child nodes with the support degree greater than the preset support degree threshold value is formed, and the semantic information of each child node in the frequent item set is output in ascending order and the semantic information of the node is output; and
    otherwise, only the semantic information of the node is output.

4. The human-machine multi-turn conversation method according to claim 1, wherein the method further comprises:
    S5, updating the knowledge graph in real time according to information input by the user in real time.

5. The human-machine multi-turn conversation method according to claim 4, wherein S5 comprises:
    S51, collecting the information input by the user in real time to form structured data;
    S52, performing entity recognition and naming on the structured data, and forming, in the knowledge graph, a new node corresponding to the information input by the user in real time;
    S53, extracting relation data between the new node and an original node in the knowledge graph from a preset text corpus; and
    S54, performing similarity calculation and matching on the new node and the original node, so as to form a node-relation-node structure and a node-attribute-attribute value structure in combination with the relation data.

6. A human-machine multi-turn conversation system for human-machine interaction, comprising:
    a knowledge graph establishment module, configured to establish a knowledge graph of user conversation behavior information, wherein the knowledge graph of user conversation behavior information is obtained by training on a basic graph template framework, and the basic graph template framework contains basic nodes and relationships;
    an index module, configured to determine, according to information currently input by a user, a node corresponding to the information currently input and at least one child node of the node in the knowledge graph;
    a calculation module, configured to calculate a support degree of the at least one child node relative to the node according to a number of times of querying the node and the number of times of querying both the at least one child node and the node in a historical query record of the knowledge graph;

a determination module, configured to determine whether to output semantic information of the at least one child node by determining a size relation between the support degree and a preset support degree threshold value; and wherein the calculating the support degree of the at least one child node relative to the node according to the number of times of querying the node and the number of times of querying both the at least one child node and the node in the historical query record of the knowledge graph comprises:

obtaining the support degree by calculating a ratio of the number of times of querying both the at least one child node and the node to the number of times of querying the node;

wherein the knowledge graph establishment module, the index module, the calculation module and the determination module are implemented by a computing device.

7. The human-machine multi-turn conversation system according to claim 6, wherein the system further comprises:
a knowledge graph updating module configured to update the knowledge graph in real time according to information input by the user in real time, wherein the knowledge graph updating module is implemented by the computing device.

8. An intelligent apparatus according to claim 1, comprising:
a processor; and
a memory storing an executable code, wherein when executing the executable code, the processor performs the human-machine multi-turn conversation method for human-machine interaction, wherein the method comprises:
S1, establishing a knowledge graph of user conversation behavior information, wherein the knowledge graph of user conversation behavior information is obtained by training on a basic graph template framework, and the basic graph template framework contains basic nodes and relationships;
S2, determining, according to information currently input by a user, a node corresponding to the information currently input and at least one child node of the node in the knowledge graph;
S3, calculating a support degree of the at least one child node relative to the node according to a number of times of querying the node and the number of times of querying both the at least one child node and the node in a historical query record of the knowledge graph; and
S4, determining whether to output semantic information of the at least one child node by determining a size relation between the support degree and a preset support degree threshold value, wherein in S3, the support degree is obtained by calculating a ratio of the number of times of querying both the at least one child node and the node to the number of times of querying the node.

9. The intelligent apparatus according to claim 8, wherein in S4, whether the support degree is greater than the preset support degree threshold value is determined;
in a case that the support degree is greater than the preset support degree threshold value, the semantic information of the at least one child node is output and semantic information of the node is output; and
otherwise, only the semantic information of the node is output.

10. The intelligent apparatus according to claim 8, wherein in S4,
whether the support degree is greater than the preset support degree threshold value is determined;
in a case that the support degree is greater than the preset support degree threshold value, a frequent item set containing all the child nodes with the support degree greater than the preset support degree threshold value is formed, and the semantic information of each child node in the frequent item set is output in ascending order from large support degrees to small support degrees and the semantic information of the node is output; and
otherwise, only the semantic information of the node is output.

11. The intelligent apparatus according to claim 8, wherein the method further comprises:
S5, updating the knowledge graph in real time according to information input by the user in real time.

12. The intelligent apparatus according to claim 11, wherein S5 comprises:
S51, collecting the information input by the user in real time to form structured data;
S52, performing entity recognition and naming on the structured data, and forming, in the knowledge graph, a new node corresponding to the information input by the user in real time;
S53, extracting relation data between the new node and an original node in the knowledge graph from a preset text corpus; and
S54, performing similarity calculation and matching on the new node and the original node, so as to form a node-relation-node structure and a node-attribute-attribute value structure in combination with the relation data.

* * * * *